United States Patent [19]

Kozaki et al.

[11] Patent Number: 4,779,960

[45] Date of Patent: Oct. 25, 1988

[54] TWISTED NEMATIC LIQUID CRYSTAL DISPLAY DEVIC HAVING A PARTICULAR PITCH-TO-THICKNESS RATIO

[75] Inventors: Shuichi Kozaki, Nara; Yukiko Ichimura, Itami; Yozo Narutaki, Tenri, all of Japan

[73] Assignee: Sharp Kabushiki Kaisha, Osaka, Japan

[21] Appl. No.: 17,080

[22] Filed: Feb. 20, 1987

[30] Foreign Application Priority Data

Feb. 20, 1986 [JP] Japan .................. 61-36042

[51] Int. Cl.$^4$ .............................................. G02F 1/13
[52] U.S. Cl. ...................... 350/346; 350/341; 350/350 R
[58] Field of Search ............... 350/341, 346, 350 R

[56] References Cited

U.S. PATENT DOCUMENTS 4,494,824  1/1985  Nakamura et al. ............... 350/334
4,653,865  3/1987  Kando et al. ...................... 350/346

FOREIGN PATENT DOCUMENTS 0155033  9/1985  European Pat. Off. .
3126362  6/1982  Fed. Rep. of Germany .
3327300  2/1984  Fed. Rep. of Germany .
3423993  1/1985  Fed. Rep. of Germany .
2080561  2/1982  United Kingdom .
2127169  4/1984  United Kingdom .
2143336  2/1985  United Kingdom .

OTHER PUBLICATIONS

Scheffer et al, "SID International Symposium", pp. 120-123 (1985).

Primary Examiner—Stanley D. Miller
Assistant Examiner—Richard F. Gallivan
Attorney, Agent, or Firm—Birch, Stewart, Kolasch & Birch

[57] ABSTRACT

The twisted nematic liquid crystal display device of this invention relates to a liquid crystal cell having a twisted spiral structure by disposing a pair of substrates opposedly to each other with the rubbed orientation films formed on the electrodes, placing a nematic liquid crystal having a positive dielectric anisotrophy containing an optically active substance between this pair of substrates, and shifting the orientation direction of the liquid crystal molecules by a specified angle of $\phi$ on both substrates, in which the angle $\phi$ is set in a range of $210° \leq \phi \leq 300°$, and the ratio $d/p$ of the spiral pitch $p$ of the liquid crystal molecules to layer thickness $d$ of the liquid crystal cell is set in a range of $(\phi/360 - \frac{1}{4}) < d/p < \phi/360$.

7 Claims, 4 Drawing Sheets

PRIOR ART

TWISTED NEMATIC LIQUID CRYSTAL DISPLAY DEVICE HAVING A PARTICULAR PITCH-TO-THICKNESS RATIO

BACKGROUND OF THE INVENTION

1. Field of the Invention

This invention relates to a twisted nematic (TN) liquid crystal display device having an enhanced multiplex driving characteristic.

2. Prior Art

A schematic sectional diagram of a conventional twisted nematic (TN) liquid crystal display device is shown in FIG. 5. In this diagram, in order to orient so that nematic liquid crystal molecules may be formed in a twisted spiral structure between two electrode forming substrates a, b, for example, the oblique evaporation method or the so-called rubbing method of rubbing the surface of electrode substrates contacting with the liquid crystal in one direction by using a cloth may be employed. When the two electrode substrates a, b thus oriented are opposedly placed so that the orientation directions may be orthogonal to each other as shown in FIG. 6, and nematic liquid crystal g having a positive dielectric antisotrophy is injected into their gap, the liquid crystal molecules are arranged in a spiral structure rotated 90° between the electrode substrates a, b. In FIG. 6, "j" denotes the rubbing direction of upper electrode substrate a, and "k" indicates the rubbing direction of lower electrode substrate b. Polarizing plates h, i are disposed above and beneath the liquid crystal cell composed in this way, in which the direction of axis of polarization l of the polarizing plate h and the direction of axis of polarization m of the polarizing plate i are arranged so as to coincide nearly with the polarizing directions of the upper and lower electrode substrates a, b respectively (see FIG. 6). Meanwhile, in FIG. 5, c, d are transparent electrodes, and e, f are deflecting films.

Incidentally, when such conventional matrix type liquid crystal display device is driven by the optimum voltage averaging method of count number N, the ratio α of the effective voltage at lit picture element Vrms(ON) to the effective voltage at unlit picture element Vrms(OFF) is expressed as follows:

$$\alpha = \frac{Vrms(ON)}{Vrms(OFF)} = \sqrt{\frac{\sqrt{N}+1}{\sqrt{N}-1}}.$$

In this equation, if $N \to \infty$, then $\alpha \to 1$. That is, as the count number N increases, the difference between Vrms(OFF) and Vrms(ON) decreases. Therefore, to realize a matrix type liquid crystal display device with a huge quantity of display information, in order to obtain a favorable contrast ratio if the voltage difference of Vrms(ON) and Vrms(OFF) is small, it is required to develop a liquid crystal material possessing a sharp threshold characteristic or improve the orientation film. Recently, in particular, in the field of liquid crystal display device, as the display information increases, there is a mounting demand for an expansion of the quantity of display information. However, in such conventional TN liquid crystal display devices, it is not flexible enough to cope with increase of the count number N.

Accordingly, as a method of improving the above point, an attempt to improve the multplex driving characteristic by setting the twisting angle φ of the liquid crystal molecules larger than 90° has been proposed. That is, in order to twist the liquid crystal molecules more than 90°, an optical active substance to induce the twisted spiral structure of liquid crystal molecules is added more to the nematic liquid crystal, and the content of the optical active substance is adjusted so that the ratio d/p of the resultant spiral pitch p of nematic liquid crystal to the liquid crystal layer thickness d may nearly satisfy the relation of $d/p \approx \phi/360°$.

However, in such a liquid crystal display device having a high content of an optical active substance, the orientation of the liquid crystal molecules was disturbed when a voltage was applied, and the light scattered about as a result to lower the contrast ratio. To solve this problem, it was also attempted to form an orientation film by oblique evaporation and extend the angle formed by liquid crystal molecules and electrode substrates, that is, the pretilt angle, but in this oblique evaporation method, it is not easy to form a uniform orientation film over a wide area and it was difficult to obtain a liquid crystal display device of a wide area. Besides, in this method, since it was difficult to orient uniformly and simultaneously on plural electrode substrates, it was difficult to apply in a mass production system.

SUMMARY OF THE INVENTION

Hence to solve the above-discussed problems, it is a primary object of this invention to present a twisted nematic liquid crystal display device excelling in the multiplex driving characteristic and which is applicable as a liquid crystal display device of high duty multiplex driving.

It is another object of this invention to present a twisted nematic liquid crystal display device which can be oriented by the rubbing method and is notably improved in the mass production efficiency.

In order to achieve the above objects, the twisted nematic liquid crystal display device of this invention relates to a liquid crystal cell having a twisted spiral structure by disposing a pair of substrates opposedly to each other with the rubbed orientation films formed on the electrodes, placing a nematic liquid crystal having a positive dielectric anisotrophy containing an optical active substance between this pair of substrates, and shifting the orientation direction of said liquid crystal molecules by a specified angle of φ on both substrates, wherein said angle is set in a range of $210° \leq \phi \leq 300°$, and the ratio d/p of the spiral pitch p of said liquid crystal molecules to layer thickness d of said liquid crystal cell is set in a range of $(\phi/360 - \frac{1}{4}) < d/p < \phi/360$.

DESCRIPTION OF THE PREFERRED EMBODIMENTS

Figure 1:
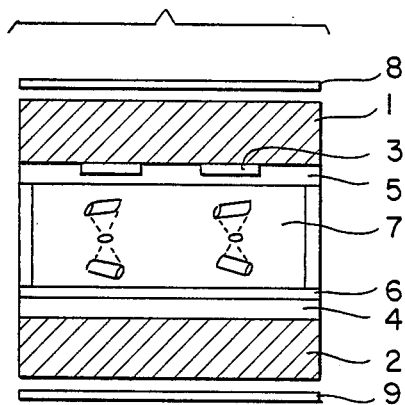
FIG. 1 is a schematic sectional diagram of a twisted nematic liquid crystal display device of this invention.

Referring now to the drawings, some of the embodiments of this invention are described below.

(1) First embodiment:

A schematic sectional view of a liquid crystal cell of this invention is shown in FIG. 1. In this diagram, transparent electrodes 3, 4 made of indium oxide are patterned and formed on the lower face of an upper glass substrate 1 and on the upper face of a lower glass substrate 2, and orientation films 5, 6 made of polyimidesilane high molecular film are formed on their surfaces respectively, and their surfaces were rubbed in one direction by using a cloth, and a liquid crystal cell was prepared. Numeral 7 refers to a liquid crystal layer, 8 is an upper polarizing plate, and 9 is a lower polarizing plate.

The orientation films 5, 6 were manufactured by applying, by using a spinner, a 30 wt.% solution of N-methyl pyrrolidone of polyamide acid which is a precursor of a polyimidesilane high molecule obtained by condensing 0.1 mol of 1,3-bis (aminopropyl)-tetramethyldisiloxane, 0.9 mol of 4,4'-diaminodephenyl ether, and 1.0 mol of 3,3', 4,4'-benzophenon tetracarboxylic anhydride in N-methyl pyrrolidone, and then heating at 350° C. for an hour to close the ring.

Figure 2:
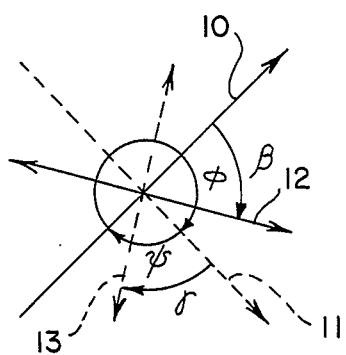
FIG 2 is a diagram to show the rubbing angle of the liquid crystal display device of this invention, the twisting angle of its liquid crystal molecules, and the setting angle of polarizing plates.

FIG. 2 is a diagram to show the relation between rubbing angle and twisting angle of liquid crystal molecule in the liquid crystal display device of the above constitution. In this diagram, $\psi$ refers to the angle formed by the rubbing direction 10 of the upper glass substrate 1 and the rubbing direction 11 of the lower glass substrate 2, and $\phi$ indicates the twisting angle of liquid crystal molecule, and it is adjusted to satisfy the relation of $\psi = 360° - \phi$. Incidentally, it is known already that the twisting angle of liquid crystal molecule depends on the value of the ratio d/p of the intrinsic spiral pitch p induced by adding an optically active substance to the nematic liquid crystal to the layer thickness d of the liquid crystal layer, and that it is necessary to adjust in a range of $(\phi/360° - \frac{1}{4}) < d/p < (\phi/360° + \frac{1}{4})$ in order to set the twisting angle of liquid crystal molecule to 100. However, much has not been investigated about the generation of domain as mentioned above in consideration of the liquid crystal material and the value of d/p.

Accordingly, the present inventors searched for domain-free d/p region in representative nematic liquid crystals (Np) possessing positive dielectric anisotrophy, that is, biphenyl, pyrimidine, dioxane, and ester type liquid crystals. The results are shown in Table 1.

TABLE 1

| Liquid crystal material | $\phi$ | | | | |
|---|---|---|---|---|---|
| | 150° | 200° | 250° | 300° | >300° |
| (1) Biphenyl type | $0.17 < \frac{d}{p} < 0.60$ | $0.14 < \frac{d}{p} < 0.72$ | $0.44 < \frac{d}{p} < 0.69$ | $0.58 < \frac{d}{p} < 0.84$ | — |
| (2) Pyrimidine type | $0.17 < \frac{d}{p} < 0.63$ | $0.14 < \frac{d}{p} < 0.75$ | $0.44 < \frac{d}{p} < 0.71$ | $0.58 < \frac{d}{p} < 0.84$ | — |
| (3) Dioxane type | $0.17 < \frac{d}{p} < 0.57$ | $0.14 < \frac{d}{p} < 0.68$ | $0.44 < \frac{d}{p} < 0.68$ | $0.58 < \frac{d}{p} < 0.82$ | — |
| (4) Ester type | $0.17 < \frac{d}{p} < 0.65$ | $0.14 < \frac{d}{p} < 0.77$ | $0.44 < \frac{d}{p} < 0.73$ | $0.58 < \frac{d}{p} < 0.85$ | — |

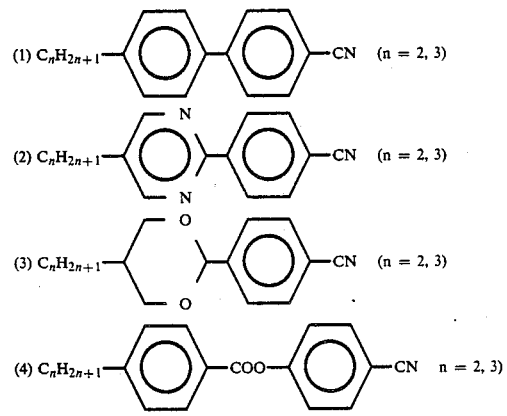

Figure 3:
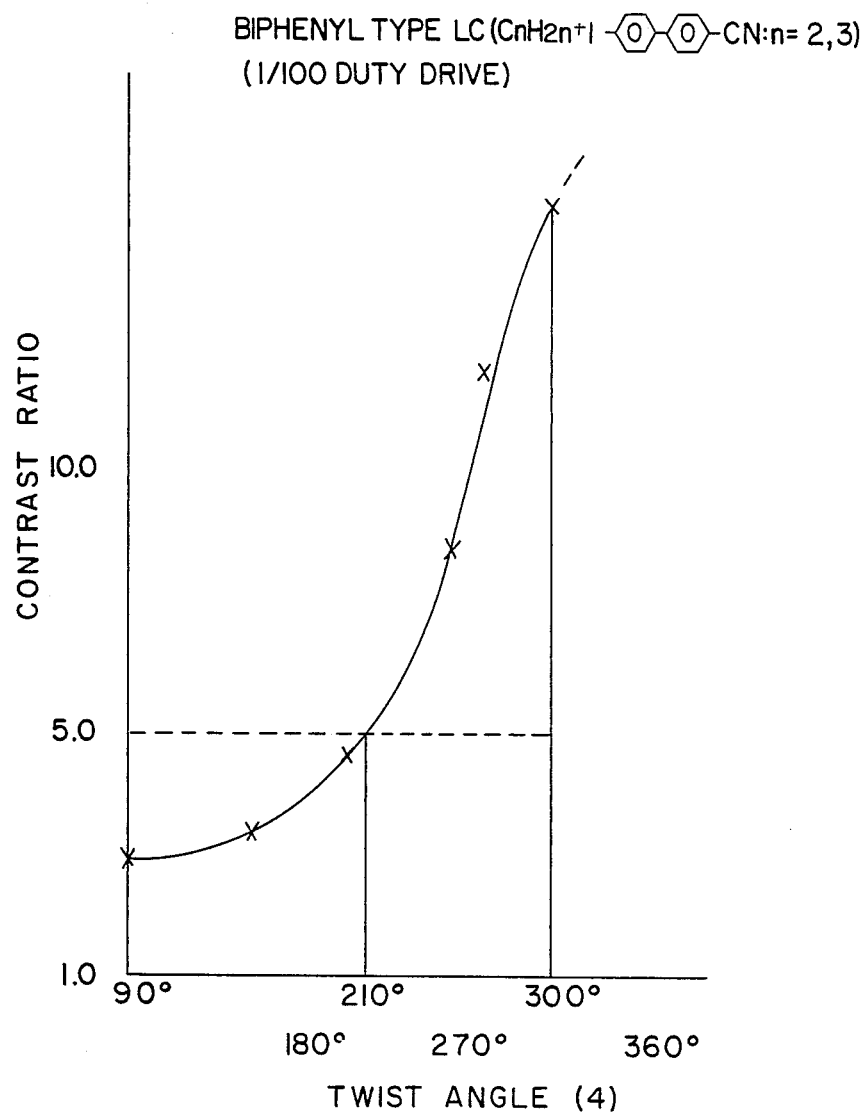
FIG. 3 is a diagram to indicate the dependency of the contrast ratio on the twisting angle φ.

From this table it is known that domain will not be generated, in any liquid crystal, if d/p is adjusted to satisfy the relation of $(\phi/360° - \frac{1}{4}) < d/p < \phi/360°$ in a range of $\phi \leq 300°$. As shown in FIG. 3, meanwhile, it is preferable to set in a range of $210 \leq \phi \leq 300°$ in order to obtain a favorable multiplex driving characteristic.

Furthermore, it is also known that the findings about the d/p region to restrict the generation of domain can be applied, not only to the liquid crystals shown in Table 1, but also to other nematic liquid crystals of which general formula is expressed as:

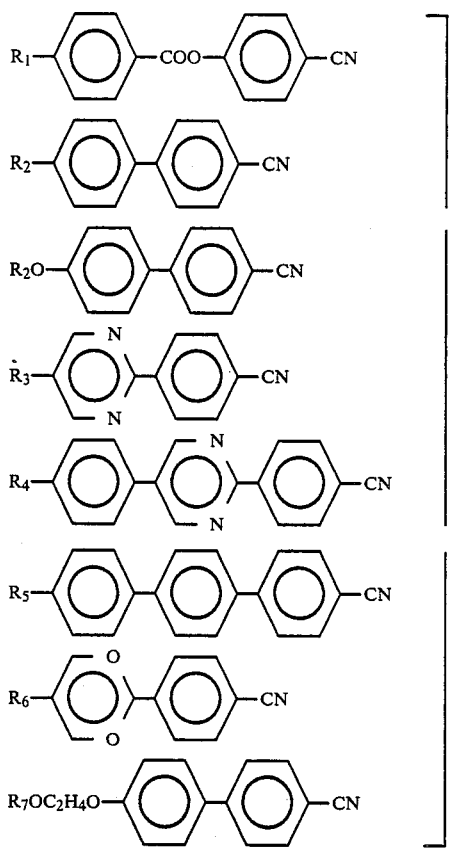

Compound group (I)

Besides, regarding orientation films 5, 6, it has been confirmed that similar results may be obtained by using the following polyimide type high molecular film which is obtained by dehydrating and closing the rings of inorganic matter such as $SiO_2$ and $SiO$ or polyamic acid.

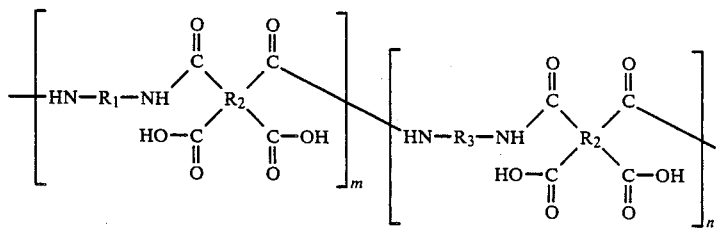

wherein
$R_1$ is

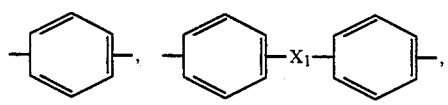

$R_2$ is

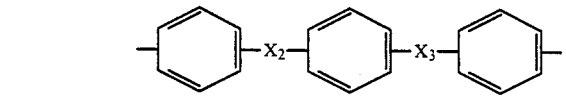

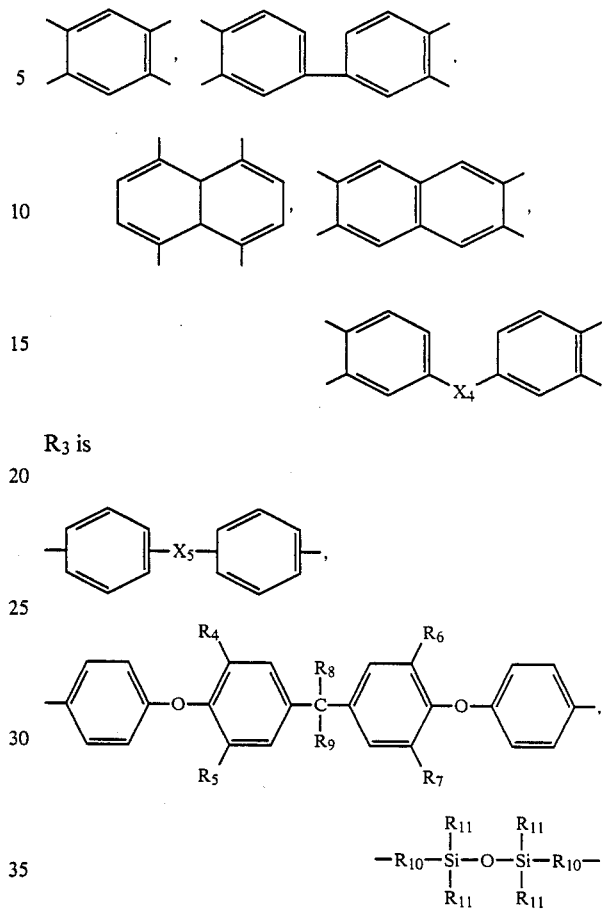

$R_3$ is and $X_1$ to $X_5$ denote $(CH_2)_n-$, $-O-(CH_2CH_2O)_n-$, $-O-$, $-S-$, $-SO_2-$, etc.; and $R_4$, $R_5$, $R_6$, $R_7$ represent hydrogen atoms and lower alkyl groups, $R_8$, $R_9$ are hydrogen atoms, methyl group, ethyl group, or trifluoromethyl group, $R_{10}$ is a bivalent hydrocarbon group, and $R_{11}$ is a monovalent hydrocarbon group.

The above results about the range of d/p to inhibit the generation of domain, however, were not applicable to such liquid crystal materials as cyanocylohexane type liquid crystal

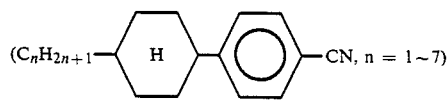

$(C_nH_{2n+1}-$ H $-$ $-CN$, $n = 1 \sim 7)$ and cyanocyclohexyl cyclohexane type liquid crystal

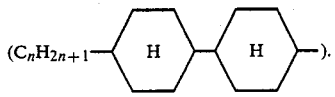

That is, in the mixed liquid crystal materials composed of these liquid crystals, when the twisting angle φ of liquid crystal is nearly over 250°, the domain inhibiting d/p range becomes very narrow, and it was found that the practical value is lost in this condition. Therefore, in the rubbed liquid crystal cell, as the condition to inhibit generation of domain, selection of the material of liquid crystal to be used and setting of d/p seem to be of the first importance.

Meanwhile, when other liquid crystal material is mixed into these Np type liquid crystals, more practical liquid crystal materials with respect to liquid crystal temperature range and response characteristics may be presented. The inventors, therefore, further investigated materials to be mixed into Np type liquid crystals, and discovered that adverse effects on the action to inhibit the generation of domain are few in the compounds included in a compound group (II) or compound group (III), as the material to be mixed into said Np type liquid crystal, wherein the compound group (II) means any compound expressed in a general formula

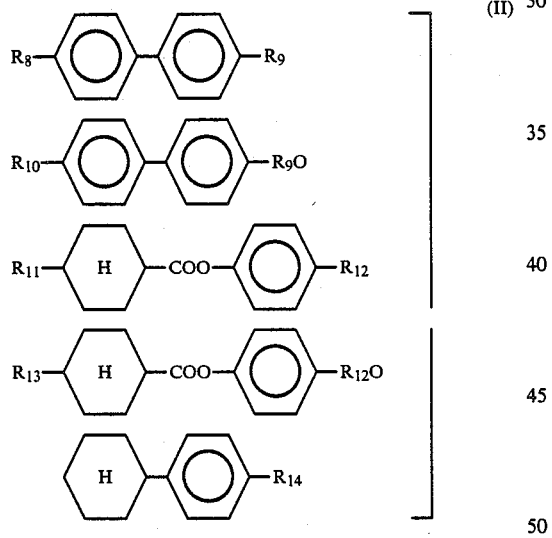

wherein $R_8$ to $R_{14}$ are straight-chain alkyl groups with 1 to 7 carbon atoms, and $R_9O$ and $R_{12}O$ are straight-chain alkoxy group with 1 to 6 carbon atoms, and the compound group (III) means any compound expressed in a general formula

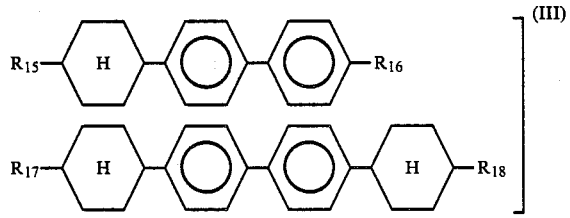

wherein $R_{15}$ to $R_{18}$ denote straight-chain alkyl groups with 1 to 7 carbon atoms. In this case, in order to present practical materials, it is preferable to mix at least one of the compounds included in the compound group (II) or compound group (III) in the Np type liquid crystal, and also to add at least one optical 14 active substance by a proper content. As the optical 14 active substance to be added, a preferable example is a chiral nematic liquid crystal expressed in

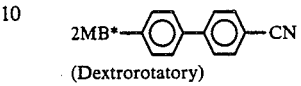
(Dextrorotatory)

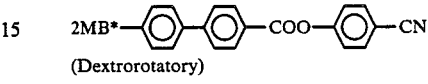
(Dextrorotatory)

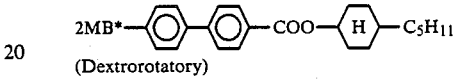
(Dextrorotatory)

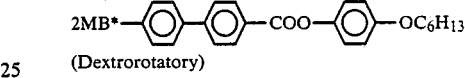
(Dextrorotatory)

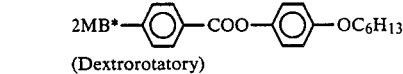
(Dextrorotatory)

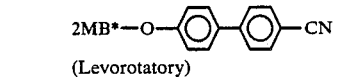
(Levorotatory)

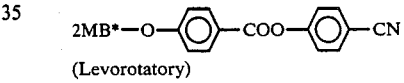
(Levorotatory)

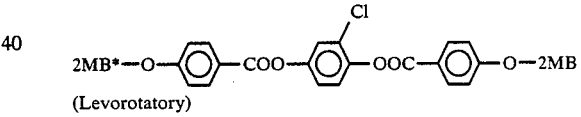
(Levorotatory)

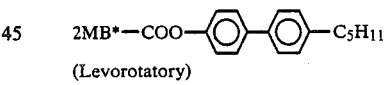
(Levorotatory)

(wherein 2MB* is

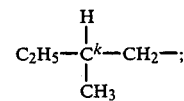

C* is a symmetric carbon), or a cholesteric liquid crystal having a cholesterol ring as expressed in

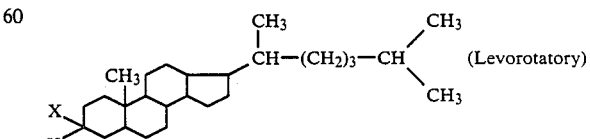
(Levorotatory)

(wherein X is

—Cl, —OCOC$_8$H$_{17}$, —OCO— 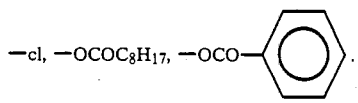

In addition, the present inventors also confirmed by investigations that the domain generation inhibiting effect is lowered if the content of Np type liquid crystal is less than about 15 wt.%. Hence, the content of Np type liquid crystal must be over 15 wt.%. As for the orientation films, too, it has been ascertained that the domain d/p region is wider in the organic material than in the inorganic material such as SiO$_2$, in the practical materials mentioned above, and that the range is widest when using, among the orientation films belonging to the organic materials, polyimide silane type high molecular film obtained from the mixture of 1,3-bis(aminopropyl)tetramethyl disiloxane, 4,4'-diaminodiphenylether and 3,3', 4,4'-benzophenon tetracarboxylic anhydride.

Therefore, by the combination of the above liquid crystal materials and orientation films, it is now possible to manufacture super-twisted nematic liquid crystal devices by rubbing treatment, which had been considered to be extremely difficult conventionally, easily and at high reproducibility.

REFERENCE EXAMPLE

The electro-optical characteristic of this embodiment is compared below with that of a conventional twisted nematic liquid crystal display device. In this case, the structure of liquid crystal cell is the same as shown in FIG. 1. The rubbing angle ψ is 90°, and the twisting angle of liquid crystal molecule φ is 270°. The layer thickness d of liquid crystal layer 4 is 4.5 μm, and the orientation films 5, 6 are the above-mentioned polyimidesilane type high molecular films. The composition of nematic liquid crystal used in this comparison is shown in Table 2.

TABLE 2

| Compound | Ratio in composition (%) |
|---|---|
| C$_4$H$_9$—⟨○⟩—COO—⟨○⟩—CN | 10.0 |
| C$_5$H$_{11}$—⟨○⟩—COO—⟨○⟩—CN | 10.0 |
| C$_6$H$_{13}$—⟨○⟩—COO—⟨○⟩—CN | 10.0 |
| C$_7$H$_{15}$—⟨○⟩—COO—⟨○⟩—CN | 10.0 |
| C$_5$H$_{11}$—⟨N○N⟩—⟨○⟩—CN | 12.0 |
| C$_7$H$_{15}$—⟨N○N⟩—⟨○⟩—CN | 12.0 |
| C$_4$H$_9$—⟨○⟩—⟨N○⟩—⟨○⟩—CN | 14.0 |
| C$_5$H$_{11}$—⟨○⟩—⟨○⟩—⟨○⟩—CN | 6.0 |
| CH$_3$—⟨○⟩—⟨○⟩—C$_5$H$_{11}$ | 10.0 |
| C$_3$H$_7$—⟨H⟩—⟨○⟩—OC$_2$H$_5$ | 6.0 |

Furthermore, this nematic liquid crystal contains 2.11 wt.% of CB-15 (dextrorotatory) as an optically active substance so that the twisting angle φ of liquid crystal molecule may be 270°. At this time, the spiral pitch p of liquid crystal is 6.9 μm, and d/p about 0.65, which is within said range of (φ/360−½)<d/p<φ/360 of the above condition. Meanwhile, since the dielectric anisotrophy Δn of the nematic liquid crystal shown in Table 2 is 0.20, the value of Δn·d is 0.9 μm. Besides, from the viewpoint of coloring of display area in the absence of electric field, it is preferable to adjust so that the value of Δn·d may settle within a range of 0.5 μm ≦ Δn·d ≦ 1.1 μm. The polarizing plates are set at angles of β=70° and γ=20°, where β is the angle formed by the direction of axis of polarization 12 of the upper polarizing plate 8 shown in FIG. 2 and the rubbing direction 10 of the upper glass substrate 1, and γ is the angle formed by the direction of axis of polarization 13 of the lower polarizing plate 9 and rubbing direction 11 of the lower glass substrate 2. Besides, from the viewpoint of the multiplex driving characteristic and coloring of the display surface in the presence of an electric field, it is preferable to set, in the case of positive type display, at β+γ=60° and in a range of 60°<β<80°, and 10°<γ<30°, and in the case of negative type display, at β+γ=180°, and in a range of 60°<β<80°, and 100°<γ<120°.

In the thus composed liquid crystal display device, it has been confirmed that the display is excellent being free from disturbance of orientation of liquid crystal molecules, that is, generation of domain, which may likely appear at the time of the application of voltage as stated above.

Figure 4:
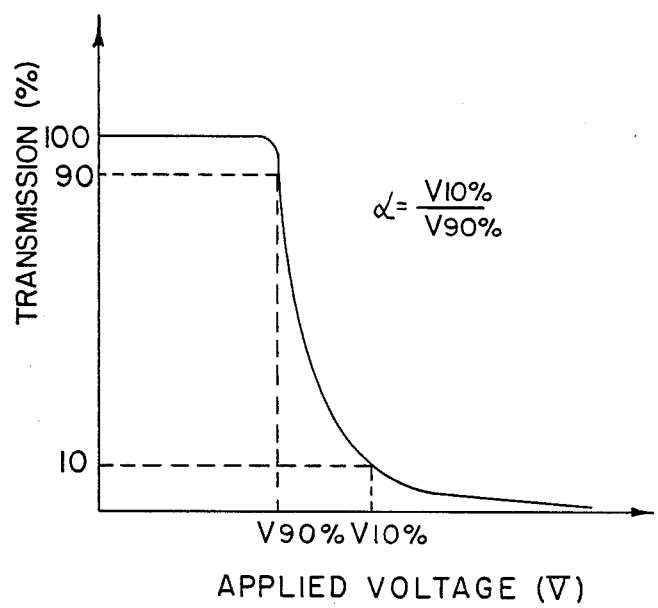
FIG. 4 is a curve to show the voltage-transmission characteristic for explaining the multiplex driving characteristic.
Figure 5:
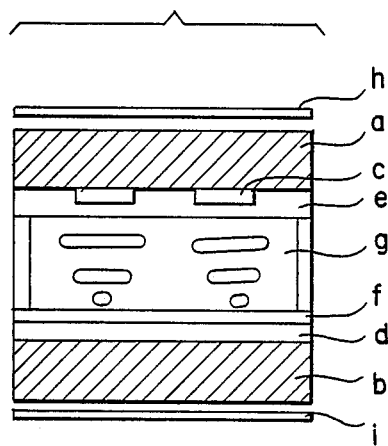
FIG. 5 is a schematic sectional view of a conventional TN liquid crystal display device.
Figure 6:
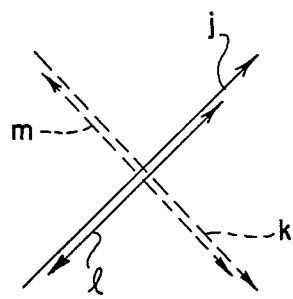
FIG. 6 is a diagram to show the rubbing angle of a conventional TN liquid crystal display device and setting angle of polarizing plates.

Next, the quantity of α explained below is defined in order to compare the multiplex driving characteristic of the liquid crystal display device based on this embodiment with that of the conventional TN liquid crystal display device. FIG. 4 shows the typical voltage-transmission characteristic including the case of this embodiment. The direction of observation is the normal direction of the liquid crystal display plane.

Supposing the voltage when the transmission is 90% to be $V_{90\%}$ and the voltage when it is 10% to be $V_{10\%}$, α is defined as $$\alpha = V_{10\%}/V_{90\%}$$

This value of α expresses the steepness of voltage-transmission characteristic, and as the value of α approaches 1, the multiplex driving characteristic improves. Accordingly, when the nematic liquid crystal in the same composition as in Table 2 was used and the value of α of the conventional TN type liquid crystal display device was measured, it was 1.50, while that of the liquid crystal display device of this invention was 1.08.

Thus, in the liquid crystal display device of this invention, the multiplex driving characteristic is notably improved. In addition, the liquid crystal display device of this invention has been confirmed to show a high contrast ratio in a wide viewing angle range as compared with the conventional liquid crystal display device.

(2) Second embodiment

Table 3 shows the composition of nematic liquid crystal used in this embodiment.

TABLE 3

| Compound | Ratio in composition (%) |
|---|---|
| $CH_3$—⌬—⌬—CN | 20.0 |
| $C_5H_{11}$—⌬—⌬—CN | 20.0 |
| $C_5H_{11}$—(pyrimidine)—⌬—CN | 5.0 |
| $C_7H_{15}$—(pyrimidine)—⌬—CN | 10.0 |
| $C_5H_{11}O$—⌬—⌬—CN | 22.0 |
| $C_4H_9$—⌬—(pyrimidine)—⌬—CN | 10.0 |
| $C_5H_{11}$—⌬—⌬—⌬—CN | 7.0 |
| $C_3H_7$—(H)—⌬—$C_2H_5$ | 6.0 |

The structure of the liquid crystal cell is the same as in the first embodiment. The concentration of the added CB-15 was 2.36 wt.%, and the spiral pitch p of the liquid crystal induced by this is 6.2 μm. Since the layer thickness d of liquid crystal layer is 4.0 μm, the ratio d/p is about 0.65. The dielectric anisotrophy of this liquid crystal Δn is 0.23, and the Δn·d is 0.92 μm. Therefore, the values of d/p and Δn·d are within the range of the condition in the first embodiment, that is, $(\phi/360 - \frac{1}{4}) < d/p < \phi/360$, $0.5\ \mu m < \Delta n \cdot d < 1.1\ \mu m$. The value of α to express the multiplex driving characteristic of thus composed liquid crystal display device was 1.09.

Hence, this embodiment has been also confirmed to show a high contrast ratio in a wide viewing angle range as compared with the conventional liquid crystal display device.

Incidentally, when the nematic liquid crystal shown in Table 4 was used, similar effects as experienced in the first and second embodiments were observed.

TABLE 4

| Compound | Ratio in composition (%) |
|---|---|
| $C_4H_9$—⌬—COO—⌬—CN | 10.0 |
| $C_5H_{11}$—⌬—COO—⌬—CN | 10.0 |
| $C_6H_{13}$—⌬—COO—⌬—CN | 9.0 |
| $C_7H_{15}$—⌬—COO—⌬—CN | 9.0 |
| $C_5H_{11}$—(pyrimidine)—⌬—CN | 10.0 |
| $C_7H_{15}$—(pyrimidine)—⌬—CN | 10.0 |

TABLE 4-continued

| Compound | Ratio in composition (%) |
|---|---|
| 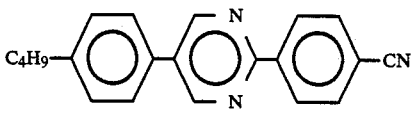 | 11.0 |
| 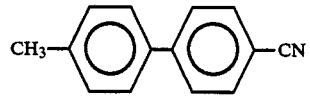 | 8.0 |
| 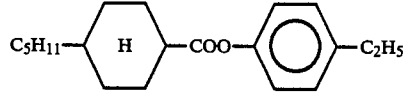 | 7.0 |
| 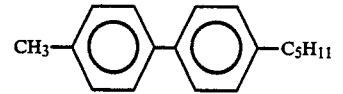 | 8.0 |
| 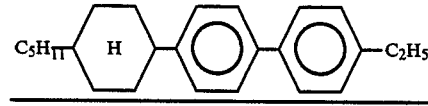 | 8.0 |

What is claimed is:

1. A twisted nematic liquid crystal display device which comprises a liquid crystal cell having a twisted spiral structure by disposing a pair of substrates opposedly to each other with the rubbed orientation films formed on the electrodes, placing a nematic liquid crystal having a positive dielectric anisotrophy containing an optically active substance between this pair of substrates, and shifting the orientation direction of liquid crystal molecules by a specified angle of $\phi$ on both substrates, wherein said angle $\phi$ is set in a range of $210° \leq \phi \leq 300°$, the ratio of d/p of the spiral pitch p of said liquid crystal molecules to layer thickness d of said liquid crystal cell is set in a range of $(\phi/360 - \frac{1}{2}) < d/p < \phi/360$, and the nematic liquid crystal comprises at least one compound of group (I)

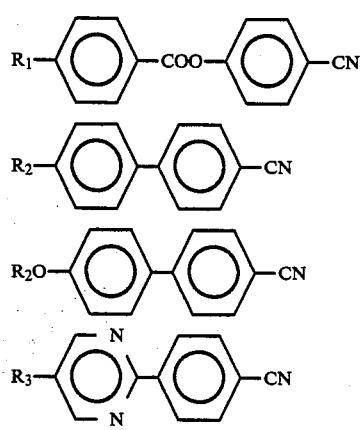

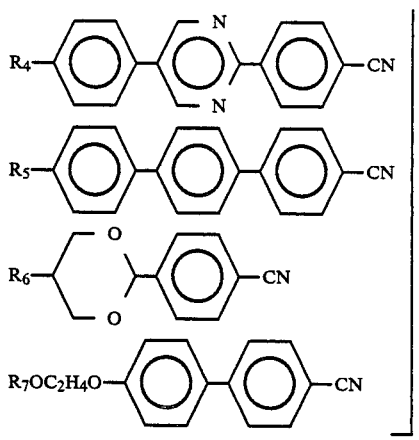

wherein $R_1$ to $R_7$ are straight-chain alkyl groups having 1 to 7 carbon atoms, and $R_2O$ is a straight-chain alkoxy group having 1 to 7 carbon atoms, with the proviso that the liquid crystal does not include cyanocyclohexane type liquid crystals or cyanocyclohexyl cyclohexane type liquid crystals.

2. The twisted nematic liquid crystal display device according to claim 1, wherein the compounds of group (I) are selected from the group consisting of (1) 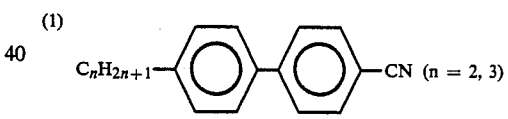 (n = 2, 3)

(2) 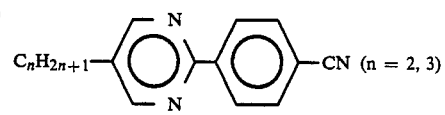 (n = 2, 3)

(3) 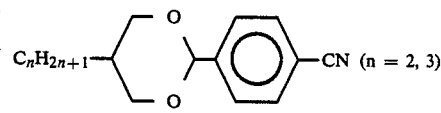 (n = 2, 3)

(4) 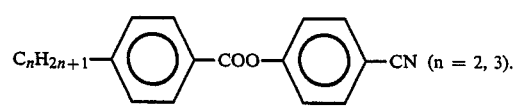 (n = 2, 3).

3. The twisted nematic liquid crystal display device according to claim 1, wherein said device contains a polyimide type high molecular film which is obtained by dehydrating and closing rings of

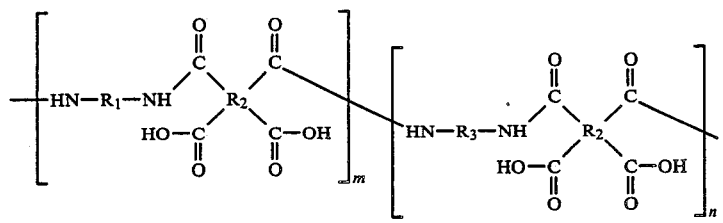

wherein
R₁ is

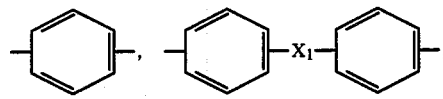

R₂ is

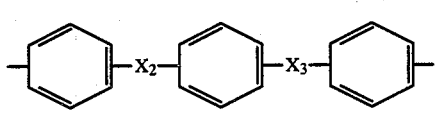

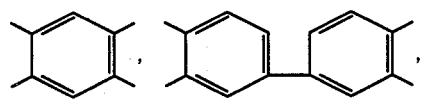

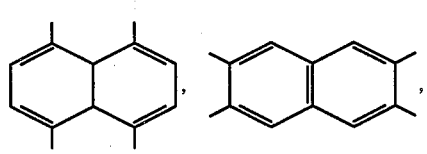

R₃ is

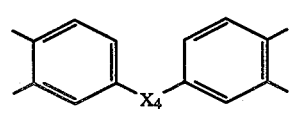

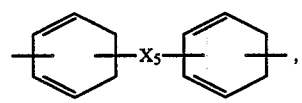

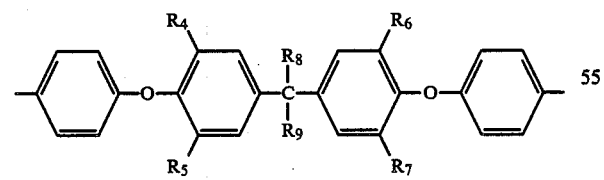

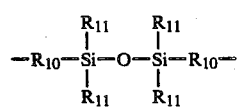

X₁ to X₅ is $(CH_2)_n$—, —O—$(CH_2CH_2O)_n$—, —O—, —S—, or —SO₂—; R₄, R₅, R₆, and R₇ represents hydrogen atoms and lower alkyl groups; R₈ and R₉ represents hydrogen atoms, methyl groups, ethyl groups, or trifluoromethyl groups; R₁₀ is a bivalent hydrocarbon group; and R₁₁ is a monovalent hydrocarbon group.

4. The twisted nematic liquid crystal device according to claim 1, wherein the optically active substance is a chiral nematic liquid crystal selected from the group consisting of

(Dextrorotatory)

(Dextrorotatory)

(Dextrorotatory)

(Dextrorotatory)

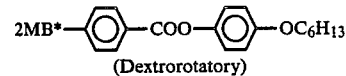
(Dextrorotatory)

(Levorotatory)

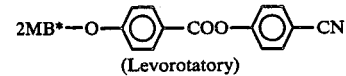
(Levorotatory)

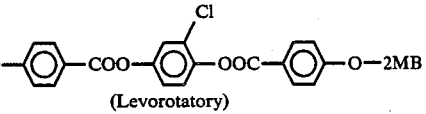
(Levorotatory)

and

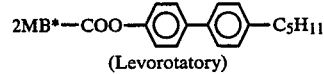
(Levorotatory)

wherein
2MB* is

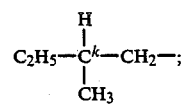

C* is a symmetric carbon, or a cholesteric liquid crystal having a cholesterol ring as expressed in

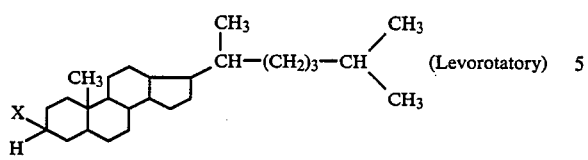

wherein

X is

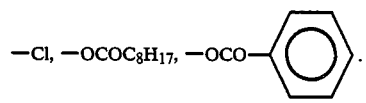

5. A twisted nematic liquid crystal display device which comprises a liquid crystal cell having a twisted spiral structure by disposing a pair of substrates opposedly to each other with the rubbed orientation films formed on the electrodes, placing a nematic liquid crystal having a positive dielectric anisotrophy containing an optically active substance between this pair of substrates, and shifting the orientation direction of liquid crystal molecules by a specified angle of $\phi$ on both substrates, wherein said angle $\phi$ is set in a range of $210° \leq \phi \leq 300°$, the range of d/p of the spiral pitch p of said liquid crystal molecules to layer thickness d of said liquid crystal cell is set in a range of $(\phi/360 - \frac{1}{2}) < d/p < \phi/360$, and the nematic liquid crystal comprises a mixture of at least one compound of group (I) and at least one compound of group (II) or group (III), Group (I):

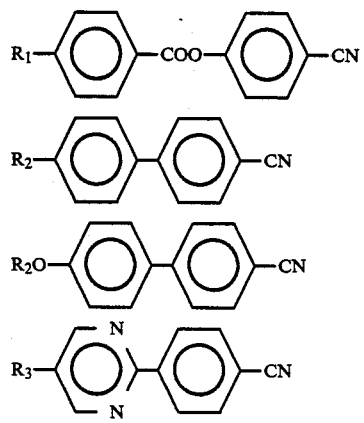

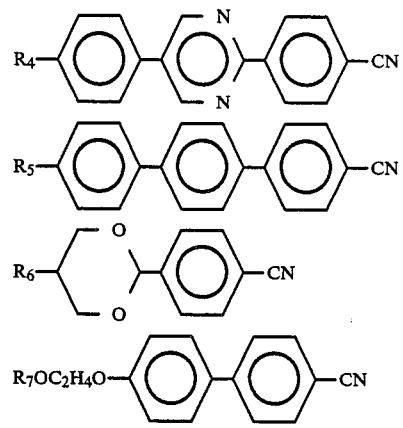

wherein $R_1$ to $R_7$ are straight-chain alkyl groups having 1 to 7 carbon atoms, and $R_2O$ is a straight-chain alkoxy group having 1 to 7 carbon atoms, Group (II):

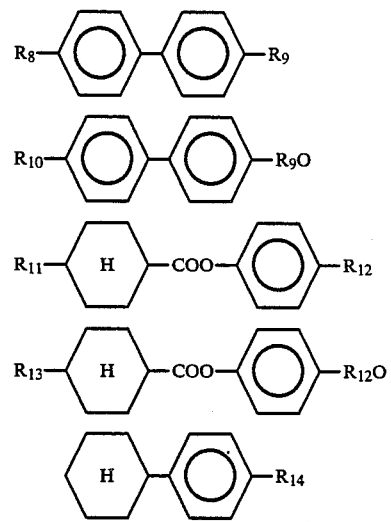

wherein $R_8$ to $R_{14}$ are straight-chain alkyl groups having 1 to 7 carbon atoms; $R_9O$ and $R_{12}O$ are straight-chain alkoxy groups having 1 to 7 carbon atoms, and Group (III):

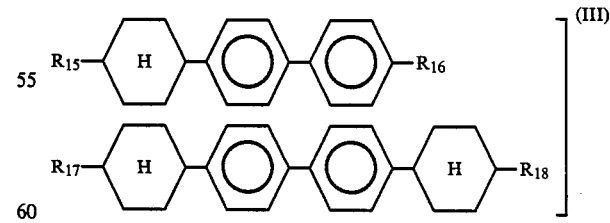

wherein $R_{15}$ to $R_{18}$ are straight-chain alkyl groups having 1 to 7 carbon atoms, and the content of the compound(s) included in group (I) may be 15 wt.% or more of the total.

6. A twisted nematic liquid crystal display device which comprises a liquid crystal cell having a twisted spiral structure by disposing a pair of substrates opposedly to each other with the rubbed orientation films formed on the electrodes, placing a nematic liquid crystal having a positive dielectric anisotrophy containing an optically active substance between this pair of substrates, and shifting the orientation direction of liquid crystal molecules by a specified angle of $\phi$ on both substrates, wherein said angle $\phi$ is set in a range of $210° \leq \phi \leq 300°$, the ratio of d/p of the spiral pitch p of said liquid crystal molecules to layer thickness d of said liquid crystal cell is set in a range of $(\phi/360 - \frac{1}{2}) < d/p < \phi/360$, and the orientation films are polyimidesilane type high molecular films obtained from a mixture of 1,3-bis(aminopropyl)tetramethyl disiloxane, 4,4'-diaminodiphenylether and 3,3', 4,4'φbenzophenontetracarboxylic anhydride.

7. A twisted nematic liquid crystal display device, which comprises:
   (i) a first polarizing plate,
   (ii) a first glass substrate disposed on the first polarizing plate,
   (iii) a first transparent electrode disposed on the first glass substrate,
   (iv) a first orientation film disposed on the first transparent electrode,
   (v) a nematic liquid crystal layer disposed on the first orientation film,
   (vi) a second orientation film disposed on the liquid crystal layer,
   (vii) a second transparent electrode disposed on the second orientation film,
   (viii) a second glass substrate disposed on the second transparent electrode, and
   (ix) a second polarizing plate disposed on the second glass substrate,
   wherein said liquid crystal cell has a twisted spiral structure, said nematic liquid crystal has a positive dielectric anisotrophy and contains an optically active substance between said substrates, the orientation direction of liquid crystal molecules being shifted by a specified angle of $\phi$ on said substrates, wherein said angle $\phi$ is set in a range of $210° \leq \phi \leq 300°$, the ratio of d/p of the spiral pitch p of said liquid crystal molecules to layer thickness d of said liquid crystal cell is set in a range of $(\phi/360 - \frac{1}{2}) < d/p < \phi/360$, and the nematic liquid crystal comprises at least one compound of group (I)

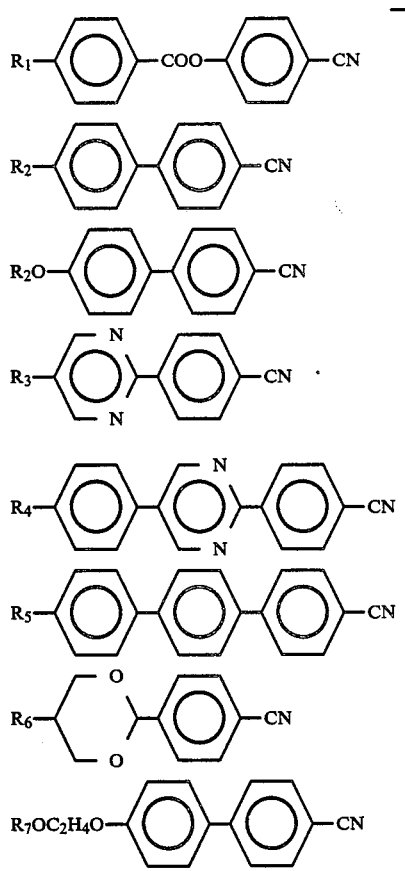

wherein $R_1$ to $R_7$ are straight-chain alkyl groups having 1 to 7 carbon atoms, and $R_2O$ is a straight-chain alkoxy group having 1 to 7 carbon atoms, with the proviso that the liquid crystal does not include cyanocyclohexane type liquid crystals or cyanocyclohexyl cyclohexane type liquid crystals.

* * * * *